(12) United States Patent
Miyazaki et al.

(10) Patent No.: US 6,401,781 B1
(45) Date of Patent: Jun. 11, 2002

(54) PNEUMATIC RADIAL TIRE WITH UNDER-BELT PAD AND SPECIFIED INTERMEDIATE RUBBER LAYER RUBBER COMPOUND

(75) Inventors: Yuji Miyazaki; Hirofumi Hayashi, both of Osaka (JP)

(73) Assignee: Toyo Tire & Rubber Co., Ltd., Osaka-fu (JP)

( * ) Notice: Subject to any disclaimer, the term of this patent is extended or adjusted under 35 U.S.C. 154(b) by 0 days.

(21) Appl. No.: 09/527,921

(22) Filed: Mar. 17, 2000

Related U.S. Application Data

(62) Division of application No. 09/008,972, filed on Jan. 20, 1998, now Pat. No. 6,138,731.

(51) Int. Cl.⁷ .................................................. B60C 9/18
(52) U.S. Cl. ........................................ 152/532; 152/537
(58) Field of Search ............................... 152/526, 532, 152/537; 525/232; 524/426, 457, 493, 495, 505, 508, 509, 515, 540, 541, 555

(56) References Cited

U.S. PATENT DOCUMENTS

| | | | |
|---|---|---|---|
| 3,638,703 A | * 2/1972 | Endter et al. ............... | 152/330 |
| 4,082,132 A | 4/1978 | Arai et al. | |
| 4,193,437 A | * 3/1980 | Powell ....................... | 152/330 |
| 4,273,177 A | 6/1981 | Nybakken | |
| 4,782,106 A | * 11/1988 | Fricke et al. ............... | 524/413 |
| 4,987,939 A | * 1/1991 | Yamada et al. .............. | 152/556 |
| 5,394,919 A | * 3/1995 | Sandstrom et al. ......... | 152/537 |
| 5,840,113 A | * 11/1998 | Freeman et al. ............ | 106/487 |
| 6,138,731 A | * 10/2000 | Miyazaki et al. ........... | 152/532 |
| 6,230,773 B1 | * 5/2001 | Sandstrom et al. ......... | 152/517 |

FOREIGN PATENT DOCUMENTS

| | | |
|---|---|---|
| JP | 2-37002 | 2/1990 |
| JP | 5032104 | 2/1993 |
| JP | 6-25285 | 4/1994 |
| JP | 6320904 | 11/1994 |
| JP | 7118457 | 5/1995 |

* cited by examiner

*Primary Examiner*—Edward J. Cain
*Assistant Examiner*—Katarzyna W. Lee
(74) *Attorney, Agent, or Firm*—Marshall, Gerstein & Borun

(57) ABSTRACT

A pneumatic radial tire is provided which comprises an under-belt pad (3) provided circumferentially between edge portions of a belt (1) and a carcass in a shoulder portion thereof, the under-belt pad (3) being of a rubber compound containing 10 to 60 parts by weight of carbon black and 3 to 30 parts by weight of silica with a total amount of carbon black and silica being 20 to 65 parts by weight, 2 to 5 parts by weight of sulfur and 0.5 to 3 parts by weight of resorcin or a resorcin derivative all relative to 100 parts by weight of rubber, and 0.5 to 2 parts by weight of hexamethylene tetramine or a melamine derivative as a methylene donor relative to 1 part by weight of the resorcin or the resorcin derivative, and having a dynamic viscoelasticity E' or 5 MPa to 10 MPa, a loss tangent tanδ of 0.10 to 0.18 and a 300% modulus of 11 MPa to 15 MPa.

4 Claims, 2 Drawing Sheets

PNEUMATIC RADIAL TIRE WITH UNDER-BELT PAD AND SPECIFIED INTERMEDIATE RUBBER LAYER RUBBER COMPOUND

CROSS-REFERENCE TO RELATED APPLICATIONS

This application is a divisional application of U.S. application Ser. No. 09/008,972, filed Jan. 20, 1998 U.S. Pat. No. 6,138,731.

TECHNICAL FIELD

The present invention relates to a pneumatic radial tire and, more particularly, to a pneumatic radial tire which have an improved tire durability and an improved heat build-up suppressing property in its shoulder portions.

BACKGROUND ARTS

Tires typically have a-construction such that a carcass, edge portions of a belt, an under-belt pad and the like are intricately combined with each other in its shoulder portion: The under-belt pad provided continuously along the circumferential shoulder portion of the tire between a tread rubber portion and the carcass and extending outwardly of the belt edge portions along the width of the tire is a thick rubber layer, which is a structural characteristic for alleviating a shear stress possibly generated between the belt edge portions and the carcass. Further, since the under-belt pad is repeatedly subjected to loads during running, heat is liable to build up in the under-belt pad, thereby causing internal rubber destruction in the under-belt pad and adhesion failures between the rubber components and between a rubber portion and-cords (steel cords) in the carcass. This causes separation of the belt edge portions and ply separation in the carcass resulting in breakdown of the tire. One conventional approach to this problem is that the under-belt pad is formed of a rubber compound which contains a reduced amount of carbon black for suppression of the heat build-up.

However, the rubber compound for the under-belt pad is softened by the reduction of the carbon black content therein. This also results in the adhesion failure and the internal rubber destruction in the under-belt pad due to the heat build-up, thereby causing the ply separation and the belt separation in the tire during running. Therefore, this approach is not satisfactory in terms of the durability of the tire. The deterioration of the durability of the tire which results from the heat build-up attributable to the structural characteristic of the under-belt pad is a more critical problem, since the recent performance improvement of automobiles requires that tires have a higher durability under higher speed running and heavy loads.

SUMMARY OF THE INVENTION

In accordance with one aspect of the present invention, there is provided a pneumatic radial tire comprising an under-belt pad interposed circumferentially between edge portions of said belt and said carcass in a shoulder portion thereof, the under-belt pad being of a rubber compound containing resorcin or a resorcin derivative and hexamethylene tetramine or a malamine derivative as a methylene donor, and having a dynamic viscoelasticity E' of 5 MPa to 10 MPa, a loss tangent tan δ of 0.10 to 0.18 and a 300% modulus of 11 MPa to 15 MPa.

Thus, the strength of the shoulder portion including the carcass, the belt edge portions, the under-belt pad interposed therebetween and the like, particularly, the rubber-rubber adhesion strength between the under-belt pad and the carcass and the rubber-cord adhesion strength in the carcass can be enhanced. In addition, the under-belt pad has a low heat build-up property and an appropriate softness. As a result, even with the under-belt pad which has a large rubber thickness and is to be repeatedly subjected to loads during running, the shoulder portion of the tire exhibits a satisfactory durability.

This makes it possible to solve the problems associated with the characteristic structure of the conventional under-belt pad (i.e., the separation between steel ply coads and rubber in the carcass and the separation of the belt edge portions which result from the rubber-rubber adhesion failure, the rubber-cord adhesion failure and the internal rubber destruction in the under-belt pad due to internal heat build-up which may occur due to the large thickness of the rubber under-belt pad and the loads repeatedly applied thereto during running).

A rubber compound having a dynamic viscoelasticity E' of less than 5 MPa is too soft to be used as a material for the under-belt pad of the pneumatic tire. Even though a satisfactory rubber-rubber adhesion strength and rubber-cord adhesion strength in the tire can initially be ensured with the use of such a rubber compound by the addition of resorcin or the resorcin derivative and hexamethylene tetramine or the melamine derivative as the methylene donor to the rubber compound, the adhesion failure and the internal rubber destruction are liable to occur due to heat build-up resulting from loads applied to the under-belt pad during running, thereby causing the ply separation and the belt edge separation in the tire. Therefore, the rubber compound having a dynamic viscoelasticity E' of less than 5 MPa is not preferred in terms of the tire durability. A rubber compound having a dynamic viscoelasticity E' of greater than 10 MPa lacks in softness when used as the material for the under-belt pad of the pneumatic tire. Accordingly, internal heat build-up is liable to occur in the under-belt pad during running even though a satisfactory rubber-rubber adhesion strength and rubber-cord adhesion strength in the tire can initially be ensured with the use of such a rubber compound by the addition of resorcin or the resorcin derivative and hexamethylene tetramine or the melamine derivative as the methylene donor to the rubber compound. Therefore, the rubber compound is not preferred in terms of the tire durability.

A rubber compound having a loss tangent tan δ of greater than 0.18 is not preferable as the material for the under-belt pad of the pneumatic tire in terms of the tire durability. Even though a satisfactory rubber-cord adhesion strength and rubber-rubber adhesion strength in the tire can initially be ensured with the use of such a rubber compound by the addition of resorcin or the resorcin derivative and hexamethylene tetramine or the melamine derivative as the methylene donor to the rubber compound, internal heat build-up is liable to occur in the under-belt pad during running, causing the internal rubber destruction, the rubber-cord adhesion failure, and the rubber-rubber adhesion failure. This results in the ply separation and the belt edge separation in the tire, so that the breakage of the tire is liable to occur. The use of a rubber compound having a loss tangent tan δ of less than 0.10 as the material for the under-belt pad of the pneumatic tire suppresses the heat build-up in the under-belt pad, but reduces the reinforcement effect to reduce the fatigue resistance.

A rubber compound having a 300% modulus of less than 11 MPa is too soft to be used as the material for the under-belt pad of the pneumatic tire. Even though a satisfactory rubber-rubber adhesion strength and rubber-cord adhesion strength in the tire can initially be ensured with the use of such a rubber compound by the addition of resorcin or the resorcin derivative and hexamethylene tetramine or the melamine derivative as the methylene donor to the rubber compound, the internal rubber destruction occurs in the under-belt pad due to loads applied to the under-belt pad during running. Therefore, the durability of the tire is deteriorated. A rubber compound having a 300% modulus of greater than 15 MPa lacks in softness when used as the material for the under-belt pad which has a large rubber thickness and is to be repeatedly subjected to loads during running. Even though a satisfactory rubber-rubber adhesion strength and rubber-cord adhesion strength can initially be ensured with the use of such a rubber compound by the addition of resorcin or the resorcin derivative and hexamethylene tetramine or the melamine derivative as the methylene donor to the rubber compound, the internal rubber destruction is liable to occur in the under-belt pad thereby to deteriorate the tire durability.

As previously described, the under-belt pad has a structural characteristic of a large rubber thickness. In view of this, there is provided, in accordance with another aspect of the present invention, a pneumatic radial tire comprising an intermediate rubber layer interposed between an under-belt pad and a carcass, the intermediate rubber layer being of a rubber compound containing resorcin or a resorcin derivative and hexamethylene tetramine or a melamine derivative as a methylene donor and having a dynamic viscoelasticity E' of 5 MPa to 10 MPa, a loss tangent tan δ of 0.10 to 0.18 and a 300% modulus of 11 MPa to 15 MPa.

In the case of the pneumatic tire having the intermediate rubber layer interposed between the under-belt pad and the carcass, the strength of the shoulder portion of the tire including the carcass, edge portions of a belt, the under-belt pad interposed therebetween and the like, particularly, the rubber-rubber adhesion strength between the under-belt pad and the carcass and the rubber-cord adhesion strength in the carcass can be enhanced. In addition, the intermediate rubber layer efficiently suppresses the heat build-up in the under-belt pad and allows the under-belt pad to have an appropriate softness. As a result, even with the under-belt pad which has a large rubber thickness and is to be repeatedly subjected to loads during running, the shoulder portion of the tire exhibits satisfactory durability.

Like the rubber compound for the under-belt pad, the rubber compound for the intermediate rubber layer is required to have a dynamic viscoelasticity E' within a range between 5 and 10 MPa, a loss tangent tan δ within a range between 0.10 and 0.18 and a 300% modulus within a range between 11 and 15 MPa. A rubber compound which does not satisfy the aforesaid property requirements is not preferable as the material for the intermediate rubber layer for the same reasons as described above, even though a satisfactory rubber-rubber adhesion strength and rubber-cord adhesion strength in the tire can initially be ensured with the use of such a rubber compound by the addition of resorcin or the resorcin derivative and hexamethylene tetramine or the melamine derivative as the methylene donor to the rubber compound.

It is, therefore, an object of the present invention to provide a pneumatic radial tire which is prevented from durability deterioration which may occur due to the heat build-up attributable to the structural characteristic of the under-belt pad in the shoulder portion thereof.

DESCRIPTION OF THE PREFERRED EMBODIMENTS OF THE INVENTION

Figure 1:
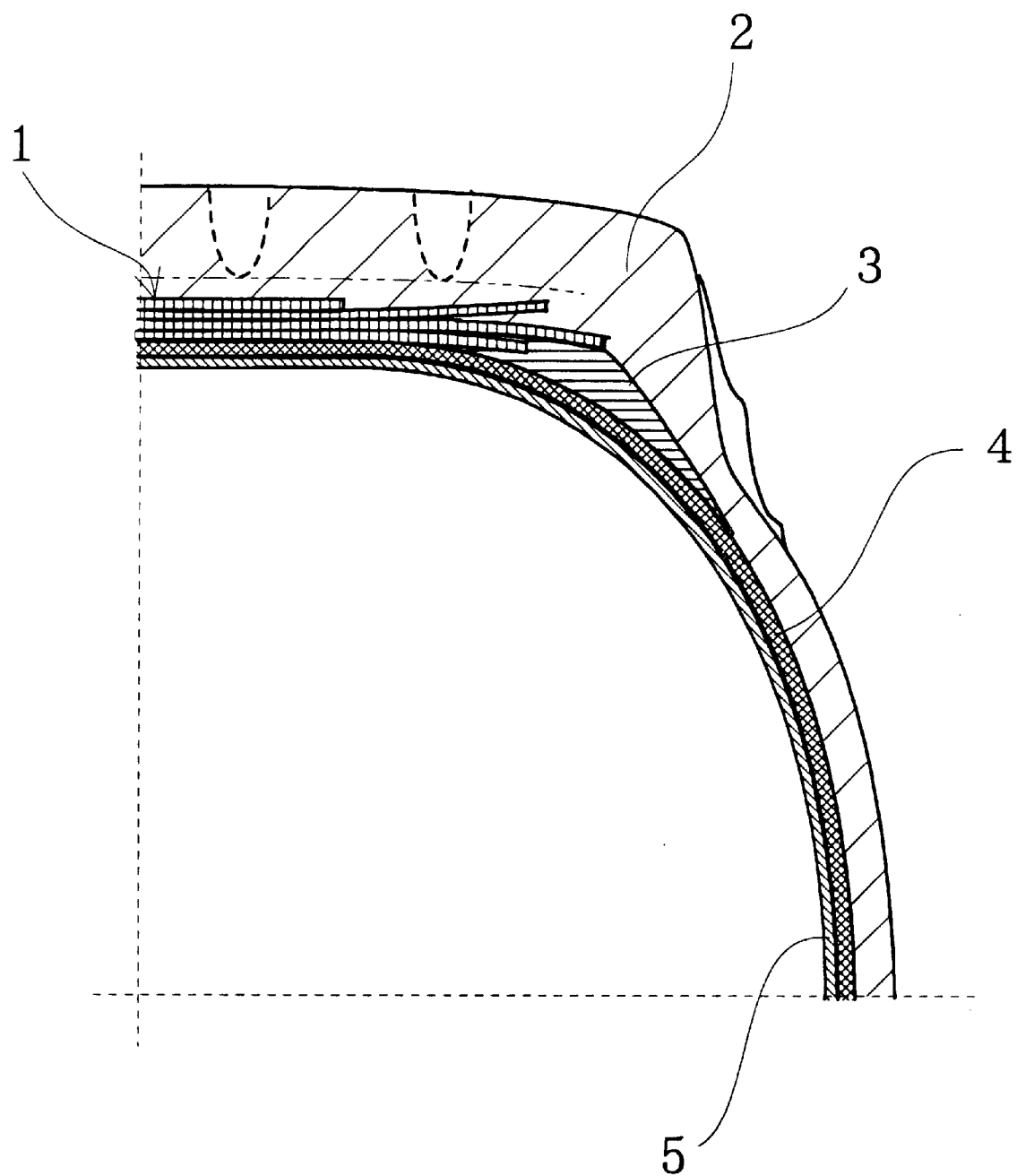
FIG. 1 is a partial sectional view illustrating an upper right portion of a tire according to one embodiment of the present invention.

In according to one embodiment of the present invention, there is provided a pneumatic radial tire comprising;

a carcass;

a tread overlying the crown region of the carcass;

a belt interposed between said tread and said crown region of said carcass, said belt including a plurality of plies of belt cords; and an under-belt pad interposed circumferentially between edge portions of said belt and said carcass in a shoulder portion thereof, the under-belt pad being of a rubber compound containing resorcin or a resorcin derivative and hexamethylene tetramine or a melamine derivative as a methylene donor, and having a dynamic viscoelasticity E' of 5 MPa to 10 MPa, a loss tangent tan δ of 0.10 to 0.18 and a 300% modulus of 11 MPa to 15 MPa.

In according to another embodiment of the present invention, there is provided a pneumatic radial tire comprising;

a carcass;

a tread overlying the crown region of the carcass;

a belt interposed between said tread and said crown region of said carcass, said belt including a plurality of plies of belt cords; and an under-belt pad interposed circumferentially between edge portions of a belt and a carcass and an intermediate rubber layer interposed between the under-belt pad and the carcass in a shoulder portion thereof, the intermediate rubber layer being of a rubber compound containing resorcin or a resorcin derivative and hexamethylene tetramine or a melamine derivative as a methylene donor and having a dynamic viscoelasticity E' of 5 MPa to 10 MPa, a loss tangent tan δ of 0.10 to 0.18 and a 300% modulus of 11 MPa to 15 MPa.

As previously described, the rubber compound to be used as the material for the under-belt pad or the intermediate rubber layer contains resorcin or the resorcin derivative and hexamethylene tetramine or the melamine derivative as the methylene donor and has a dynamic viscoelasticity E' of 5 MPa to 10 MPa, a loss tangent tan δ of 0.10 to 0.18 and a 300% modulus of 11 MPa to 15 MPa.

As long as the aforesaid property requirements are satisfied, other ingredients to be contained in the rubber compound for the under-belt pad or the intermediate rubber layer are not particularly limited. Specifically, the rubber compound preferably contains 10 to 60 parts by weight of carbon black and 3 to 30 parts by weight of silica with a total amount of carbon black and silica being 20 to 65 parts by weight, and 2 parts to 5 parts by weight of sulfur relative to 100 parts by weight of a rubber.

If the proportion of carbon black is less than 10 parts by weight relative to 100 parts by weight of the rubber, the resulting rubber compound cannot ensure a satisfactory reinforcement effect and durability even though a satisfactory rubber-rubber adhesion strength and rubber-cord adhesion strength in the tire can initially be ensured by the addition of resorcin or the resorcin derivative and hexamethylene tetramine or the melamine derivative as the methylene donor to the rubber compound. If the proportion of carbon black is greater than 60 parts by weight relative to 100 parts by weight of the rubber, the resulting rubber compound lacks in softness and, therefore, is not suitable as the material for the under-belt pad which has a large rubber thickness and is to be repeatedly subjected to loads during running. The rubber compound is liable to cause adhesion failures and internal rubber destruction in the tire, and has a poor heat build-up suppressing effect so that the durability of the tire is deteriorated.

If the proportion of silica is less than 3 parts by weight relative to 100 parts by weight of the rubber, the resulting rubber compound, even though containing resorcin or the resorcin derivative and hexamethylene tetramine or the melamine derivative as the methylene donor and having a dynamic viscoelasticity E' of 5 MPA to 10 MPa, a loss tangent tan δ of 0.10 MPa to 0.18 and a 300% modulus of 11 MPa to 15 MPa, is not suitable as the material for the under-belt pad or the intermediate rubber layer because it is difficult to impart a satisfactory tear strength and adhesive strength to the under-belt pad or the intermediate rubber layer. If the proportion of silica is greater than 30 parts by weight relative to 100 parts by weight of the rubber, the resulting rubber compound, even though containing resorcin or the resorcin derivative and hexamethylene tetramine or the melamine derivative as the methylene donor and having a dynamic viscoelasticity E' of 5 MPa to 10 MPa, a loss tangent tan δ of 0.10 to 0.18 and a 300% modulus of 11 MPa to 15 MPa, suffers premature curing and an increased mooney viscosity thereby to have a poor processability.

If the total amount of carbon black and silica is less than 20 parts by weight relative to 100 parts by weight of the rubber, the reinforcement effect and wear resistance of the resulting rubber compound are deteriorated. If the total amount of carbon black and silica is greater than 65 parts by weight, it is difficult for the resulting rubber compound to suppress the heat build-up in the under-belt pad.

If the proportion of sulfur is less than 2 parts by weight relative to 100 parts by weight of the rubber, the resulting rubber compound is not satisfactory in tire reinforcement effect and improvement of adhesion. If the proportion of sulfur is greater than 5 parts by weight relative to 100 parts by weight of the rubber, the resulting rubber compound has an insufficient softness and a lower heat resistance.

In accordance with the present invention, resorcin or the resorcin derivative and hexamethylene tetramine or the melamine derivative as the methylene donor are added to the rubber compound for the under-belt pad or the intermediate rubber layer for improvement of the adhesion strength of the under-belt pad in the shoulder portion of the tire. It has been found preferable that resorcin or the resorcin derivative is contained in a proportion of 0.5 to 3 parts by weight relative to 100 parts by weight of the rubber and hexamethylene tetramine or the melamine derivative as the methylene donor is contained in a proportion of 0.5 to 2 times the proportion of resorcin or the resorcin derivative.

If the proportion of resorcin or the resorcin derivative is less than 0.5 parts by weight relative to 100 parts by weight of the rubber, the resulting rubber compound when used as the material for the under-belt pad or the intermediate rubber layer fails to improve adhesion strength with respect to a rubber portion of the carcass and rubber-cord adhesion strength in the carcass. If the proportion of resorcin or the resorcin derivative is greater than 3 parts by weight, a cost-justified reinforcement effect cannot be ensured. If the proportion of hexamethylene tetramine or the melamine derivative as the methylene donor is less than 0.5 times the proportion of resorcin or the resorcin derivative, resorcin or the resorcin derivative is partially left unreacted. Even if the proportion of hexamethylene tetramine or the melamine derivative is greater than two times the proportion of resorcin or the resorcin derivative, the adhesion strength cannot be improved any more so that a cost-justified reinforcement effect cannot be ensured.

FIG. 1 is a partial sectional view illustrating an upper right portion of a tire according to one embodiment of the present invention. In FIG. 1, there are shown a belt 1 reinforced with steel cords, a tread rubber portion 2, an under-belt pad 3, a carcass 4 reinforced with steel cords, and an inner liner 5. The under-belt pad 3 is disposed between edge portions of the belt 1 and the carcass 4 and between the carcass 4 and the tread rubber portion 2. In this embodiment, the under-belt pad 3 has a generally triangular shape in section. The under-belt pad 3 is formed of a rubber compound comprising 10 to 60 parts by weight of carbon black and 3 to 30 parts by weight of silica with a total amount of carbon black and silica being 20 to 65 parts by weight, 2 to 5 parts by weight of sulfur, and 0.5 to 3 parts by weight of resorcin or a resorcin derivative relative to 100 parts by weight of a rubber, and 0.5 to 2 parts by weight of hexamethylene tetramine or a melamine derivative as a methylene donor relative to 1 part by weight of resorcin or the resorcin derivative, and having a dynamic viscoelasticity E' of 5 MPa to 10 MPa, a loss tangent tan δ of 0.10 to 0.18 and a 300% modulus of 11 MPa to 15 MPa. It is noted that the sectional configuration of the under-belt pad is not limited to the generally triangular shape.

Figure 2:
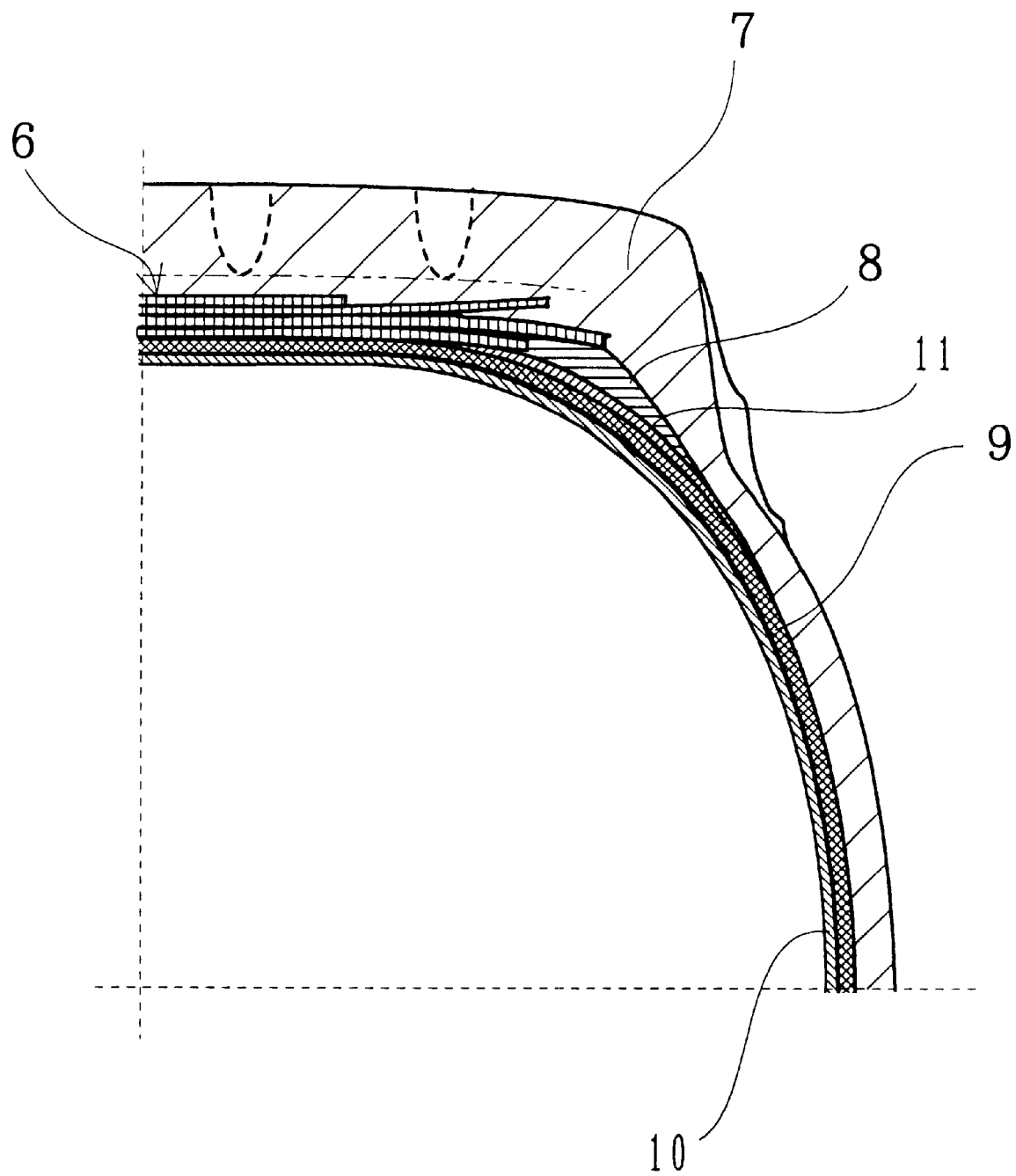
FIG. 2 is a partial sectional view illustrating an upper right portion of a tire according to another embodiment of the present invention.

FIG. 2 is a partial sectional view illustrating an upper right portion of a tire according to another embodiment of the present invention. In FIG. 2, there are shown a belt 6 reinforced with steel cords, a tread rubber portion 7, an under-belt pad 8, a carcass 9 reinforced with steel cords, and an inner liner 10. A reference numeral 11 denotes an intermediate rubber layer provided between the under-belt pad 8 and the carcass 9. In accordance with this embodiment, the intermediate rubber layer 11 is formed of a rubber compound comprising 10 to 60 parts by weight of carbon black and 3 to 30 parts by weight of silica with a total amount of carbon black and silica being 20 to 65 parts by weight, 2 parts to 5 parts by weight of sulfur, and 0.5 parts to 3 parts of resorcin or a resorcin derivative relative to 100 parts by weight of a rubber, and 0.5 to 2 parts by weight of hexamethylene tetramine or a melamine derivative as a methylene donor relative to 1 part by weight of resorcin or the resorcin derivative, and having a dynamic viscoelasticity E' of 5 MPa to 10 MPa, a loss tangent tan δ of 0.10 to 0.18 and a 300% modulus of 11 MPa to 15 MPa.

It is noted that the rubber compound can be used as materials for both the under-belt pad 8 and the intermediate rubber layer 11.

The rubber contained in the rubber compound for the under-belt pad or the intermediate rubber layer in the tire according to the present invention is not particularly limited, but preferable examples thereof include natural rubber, and diene rubbers such as isoprene rubber, styrene-butadiene rubber and polybutadiene rubber, among which natural rubber and isoprene rubber is more preferable because of their relatively low heat build-up property. These rubbers may be used either alone or in combination.

Usable as the resorcin derivative in the present invention are resorcin derivatives including resins contains ingredients of at least resorcin and formaldehyde. Examples thereof include a resorcin-formaldehyde polycondensation product, and a melt mixture of a resorcin-formaldehyde resin and an alkylphenol-formaldehyde resin. In the present invention, the resorcin derivative may be used alone (e.g., a resorcin-formaldehyde resin) or as a mixture in combination with another resin (e.g., a melt mixture of a resorcin-formaldehyde resin and an alkylphenol-formaldehyde resin).

Usable as the melamine derivative in the present invention are compounds obtained by partial etherification of methylol melamine and compounds obtained by methoxylation of a melamine-formaldehyde reaction product with methanol. Particularly preferred is a melamine derivative mixture containing melamine monomers in a proportion of 60% to 90% and melamine derivatives having 2 to 6 methoxy groups with a bound formaldehyde number of 4 to 6 in one molecule thereof. The melamine-formaldehyde reaction product includes unreacted melamine monomers, oligomers of melamine reacted with formaldehyde (melamine dimers and trimers), and polymers of melamine reacted with formaldehyde (polymers of melamine crosslinked with formaldehyde). The bound formaldehyde number is herein meant by the number of methylene groups crosslinking melamine units in the oligomers and polymers. The melamine-formaldehyde reaction product is reacted with methanol, so that hydroxy groups in the reaction product (including the melamine monomers, oligomers and polymers) are converted into methoxy groups.

The rubber compound according to the present invention may contain a vulcanizing agent, a vulcanization accelerator, a accelerator activator, a vulcanization retarder, an organic peroxide, a reinforcing agent, a plasticizer, a filler, an antioxidant, a tackifier and the like in addition to the aforesaid ingredients.

The reason why the rubber compound improves the adhesive strength when used in the tire has not been clarified yet. Supposedly, active ingredients such as resorcin or the resorcin derivative as an adhesive component and hexamethylene tetramine or the melamine derivative as a methylene donor contained in the rubber compound migrate from the under-belt pad or the intermediate rubber layer into the edge portions of the steel belts and a rubber portion of the carcass (which do not contain such active ingredients) in the shoulder portion of the tire where the thick rubber under-belt pad is provided, thereby enhancing the rubber-rubber adhesion strength and the rubber-cord adhesion strength.

EXAMPLES

In accordance with Examples and Comparative Examples, tires each having a size of 11R22.5 14PR and a construction as shown in FIG. 1 were produced by using under-belt pads respectively formed of rubber compounds containing ingredients shown in Tables 1 and 2. The rubber compounds shown in Tables 1 and 2 according to Examples and Comparative Examples each further contained the following ingredients:

| Natural rubber | 80 parts by weight |
| Isoprene rubber | 20 parts by weight |
| Zinc oxide | 10 parts by weight |
| Antioxidant 6C | 1 parts by weight |
| Vulcanization accelerator DZ | 1 parts by weight |

The rubber compounds were obtained in the following manner. Zinc oxide, antioxidant 6C mentioned above and carbon black, resorcin (or resorcin derivative) and silica were blended with natural rubber and isoprene rubber. The mixture mentioned above was kneaded by Banbury mixer, and the mixture kneaded was cooled, and hexamethylene tetramine or a melamine derivative shown in Tables 1 and 2, vulcanization accelerator DZ mentioned above and sulfur were blended with said mixture cooled.

TABLE 1

| | Examples | | | | | | | | |
|---|---|---|---|---|---|---|---|---|---|
| | 1 | 2 | 3 | 4 | 5 | 6 | 7 | 8 | 9 |
| Rubber composition (parts by wt) | | | | | | | | | |
| Resorcin | — | — | 1.0 | — | 1.5 | — | — | 0.5 | — |
| Resorcin derivative | 1.0 | 3.0 | — | 2.0 | — | 1.0 | 2.0 | — | 1.0 |
| Melamine derivative | 1.5 | 4.5 | — | 1.0 | — | 1.5 | 3.0 | — | 1.5 |
| Hexamethylene tetramine | — | — | 1.0 | — | 1.0 | — | — | 0.5 | — |
| Carbon black N326 | 30 | 40 | 45 | 35 | — | 50 | 10 | — | — |
| Carbon black N330 | — | — | — | — | — | — | — | — | 20 |
| Carbon black N660 | — | — | — | — | 20 | — | — | 60 | — |
| Silica | 5 | 10 | 10 | 15 | 25 | 5 | 30 | 3 | 5 |
| Sulfur | 4 | 4 | 3 | 2 | 5 | 3 | 5 | 3 | 3 |
| Rubber Properties | | | | | | | | | |
| Dynamic viscoelasticity E' (MPa) | 5.0 | 10.0 | 8.0 | 6.2 | 6.1 | 9.6 | 5.9 | 9.7 | 5.5 |
| Loss tangent tan δ | 0.15 | 0.13 | 0.18 | 0.12 | 0.10 | 0.18 | 0.13 | 0.17 | 0.14 |
| 300% modulus (MPa) | 12.4 | 14.7 | 12.9 | 11.0 | 11.8 | 15.0 | 11.5 | 12.1 | 11.0 |
| Tire Properties | | | | | | | | | |
| Ply cord-rubber adhesion (%) | 90–100 | 100 | 90–100 | 100 | 90–100 | 90–100 | 100 | 80–100 | 90–100 |
| Tire durability | I | I | I | I | I | II | II–I | II | II–I |

TABLE 2

| | Comparative Examples | | | | | | |
|---|---|---|---|---|---|---|---|
| | 1 | 2 | 3 | 4 | 5 | 6 | 7 |
| Rubber composition (parts by wt) | | | | | | | |
| Resorcin | — | — | — | | | | |
| Resorcin derivative | — | 1.0 | — | 3.0 | 1.0 | 1.0 | — |
| Melamine derivative | — | 1.5 | — | 4.5 | 0.3 | 1.5 | — |
| Hexamethylene tetramine | — | — | — | — | — | — | — |
| Carbon black N326 | 40 | — | 35 | 8 | 40 | 50 | 40 |

TABLE 2-continued

|  | Comparative Examples | | | | | | |
| --- | --- | --- | --- | --- | --- | --- | --- |
|  | 1 | 2 | 3 | 4 | 5 | 6 | 7 |
| Carbon black N660 | — | 63 | — | — | — | — | — |
| Silica | — | 5 | 5 | 32 | 5 | 1.5 | — |
| Sulfur | 1 | 2 | 5.5 | 5 | 3 | 3 | 3 |
| Rubber Properties | | | | | | | |
| Dynamic viscoelasticity E' (MPa) | 4.0 | 10.8 | 7.1 | 6.4 | 8.3 | 9.3 | 4.7 |
| Loss tangent tan δ | 0.17 | 0.19 | 0.13 | 0.12 | 0.15 | 0.18 | 0.13 |
| 300% modulus (MPa) | 9.6 | 15.4 | 13.0 | 12.0 | 10.4 | 13.0 | 13.1 |
| Tire Properties | | | | | | | |
| Ply cord-rubber adhesion (%) | 0–20 | 20–50 | 30–90 | 20–70 | 10–30 | 40–80 | 30–50 |
| Tire durability | III | III | II | III | III | II | II |

Used as the resorcin derivative and the melamine derivative shown in Tables 1 and 2 were a resorcin-formaldehyde polymer and a compound obtained by partial etherification of methylol melamine, respectively.

The dynamic viscoelasticity E' and the loss tangent tan δ were determined at a temperature of 30° C. with a frequency of 50 Hz, an initial strain of 15% and an amplitude of 1% by means of a dynamic viscoelasticity spectrometer available from Iwamoto Seisakusho Co.

Then, the ply cord-rubber adhesion ratio and the wheel test durability of the tires of Examples and Comparative Examples were determined. The results are shown in Tables 1 and 2. For determination of the ply cord-rubber adhesion ratio, the tires were each attached to rear wheels of a bus for long-distance highway traveling (running) and, after 200,000 km traveling (running) (a highway traveling (running) distance was 90% of the overall traveling (running) distance), the carcass ply layer was visually inspected to determine the ply cord-rubber adhesion ratio in the carcass. For determination of the tire durability, the tires were runned on a wheel test machine under the following conditions: the tire air pressure was set at 100% of a level specified by JIS D4230; the speed for the test was 40 km/hour; and the tire load was initially set at 140% of a level specified by JIS D4230 and increased by 10% every 150 hours. With Comparative Example 7 regarded as a control, running distances to tire breakdown were compared with a control running distance. If the running distance is longer by over 10% than the control running distance, the tire is rated as "Superior" and represented by "I" in the tables. If the running distance is substantially equal to the control running distance within a tolerance of ±10%, the tire is rated as "Equivalent" and represented by "II" in the tables. If the running distance is shorter by over 10% than the control running distance, the tire is rated as "Inferior" and represented by "III" in the tables.

As shown in Tables 1 and 2, the tires of Examples 1 to 9 which had under-belt pads formed of rubber compounds containing resorcin or the resorcin derivative and hexamethylene tetramine or the melamine derivative as the methylene donor each exhibited a greater ply cord-rubber adhesion ratio than the tire of Comparative Example 7 which had an under-belt pad formed of a rubber compound containing none of resorcin, the resorcin derivative, hexamethylene tetramine and the melamine derivative. The tires of Examples 1 to 9 were less susceptible to ply. separation and belt separation with an excellent tire durability.

As can be understood from Comparative Examples 1 and 2, it is critical that the rubber compound as the material for the under-belt pad which contains resorcin or the resorcin derivative and hexamethylene tetramine or the melamine derivative as the methylene donor should satisfy the property requirements, i.e., a dynamic viscoelasticity E' of 5 MPa to 10 MPa, a loss tangent tan δ of 0.18 or less and a 300% modulus of 11 MPa to 15 MPa. With a rubber compound having a loss tangent tan δ of less than 0.10, the internal heat build-up was suppressed, but the tire reinforcement effect and durability resistance were deteriorated.

It has been found preferable that the rubber compound which contains resorcin or the resorcin derivative and hexamethylene tetramine and the melamine derivative as the methylene donor and has a dynamic viscoelasticity E' of 5 MPa to 10 MPa, a loss tangent tan δ of 0.18 or less and a 300% modulus of 11 MPa to 15 MPa further contains 10 to 60 parts by weight of carbon black, 3 to 30 parts by weight of silica with the total amount of carbon black and silica being 20 to 65 parts by weight, and 2 to 5 parts by weight of sulfur relative to 100 parts by weight of the rubber.

In accordance with the present invention, the pneumatic radial tire comprises an under-belt pad provided between edge portions of a belt and a carcass in its shoulder portion, and the under-belt pad is of a rubber compound containing resorcin or a resorcin derivative and hexamethylene tetramine or a melamine derivative as a Methylene donor and having a dynamic viscoelasticity E' of 5 MPa to 10 MPa, a loss tangent tan δ of 0.10 to 0.18 and a 300% modulus of 11 MPa to 15 MPa. Therefore, the pneumatic radial tire is prevented from durability deterioration which may otherwise occur due to heat build-up in the shoulder portion of the tire attributable to the structure of the under-belt pad. Thus, the pneumatic radial tire has an excellent durability.

While the present invention has thus been described in conjunction with specific embodiments thereof, it is evident that those skilled in the art who have understood the foregoing description will readily come up with modifications, alternatives and equivalents thereto. Accordingly, it is intended that the scope of the present invention is defined by the appended claims and their equivalency.

What is claimed is:

1. A pneumatic radial tire comprising: a carcass; a tread overlying the crown region of said carcass; a belt interposed between said tread and said crown region of said carcass, said belt including a plurality of plies of belt cords; and an under-belt pad interposed circumferentially between edge portions of the belt and the carcass and an intermediate rubber layer interposed between the under-belt and the carcass in a shoulder portion thereof, the intermediate rubber layer being of a rubber compound containing resorcin or a resorcin derivative and hexamethylene tetramine or a melamine derivative as a methylene donor and having a dynamic viscoelasticity E' of 5 MPa to 10 MPa, a loss tangent tan δ of 0.10 to 0.18 and a 300% modulus of 11 MPa to 15 MPa.

2. A pneumatic radial tire as set forth in claim 1, wherein the rubber compound for the intermediate rubber layer contains 10 to 60 parts by weight of carbon black and 3 to 30 parts by weight of silica with a total amount of carbon black and silica being 20 to 65 parts by weight, and 2 to 5 parts by weight of sulfur, all relative to 100 parts by weight of rubber.

3. A pneumatic radial tire as set forth in claim 1, wherein the rubber compound for the intermediate rubber layer contains 0.5 to 3 parts by weight of the resorcin or the resorcin derivative relative to 100 parts by weight of rubber, and 0.5 to 2 parts by weight of the hexamethylene tetramine or the melaine derivative as the methylene donor relative to 1 part by weight of the resorcin or the resorcin derivative.

4. A pneumatic radial tire as set forth in claim 1, wherein the rubber compound for the intermediate rubber layer contains 10 to 60 parts by weight of carbon black and 3 to 30 parts by weight of silica with a total amount of carbon black and silica being 20 to 65 parts by weight, 2 to 5 parts by weight of sulfur and 0.5 to 3 parts by weight of resorcin or the resorcin derivative, all relative to 100 parts by weight of rubber, and 0.5 to 2 parts by weight of the hexamethylene tetramine or the melamine derivative as the methylene donor relative to 1 part by weight of the resorcin or the resorcin derivative.

* * * * *

UNITED STATES PATENT AND TRADEMARK OFFICE
CERTIFICATE OF CORRECTION

PATENT NO. : 6,401,781 B1 Page 1 of 1
DATED : June 11, 2002
INVENTOR(S) : Miyazaki It is certified that error appears in the above-identified patent and that said Letters Patent is hereby corrected as shown below:

Column 11,
Line 5, "of rubber" should be -- of a rubber --;
Line 9, "or rubber" should be -- of a rubber --; and
Line 11, "melaine" should be -- melamine --.

Signed and Sealed this

Twentieth Day of August, 2002

Attest:

JAMES E. ROGAN
Attesting Officer  Director of the United States Patent and Trademark Office